United States Patent
Zhang et al.

(10) Patent No.: US 11,249,521 B2
(45) Date of Patent: Feb. 15, 2022

(54) TOUCH PAD SENSORS OPERATIVE AS A PLURALITY OF ANTENNAS

(71) Applicant: Facebook, Inc., Menlo Park, CA (US)

(72) Inventors: Ce Zhang, Redmond, WA (US); Geng Ye, San Jose, CA (US); Bruno Cendon Martin, Palo Alto, CA (US); Jennifer Davis-Wilson, Mountain View, CA (US); Kyle Marcolini, Seattle, WA (US); Vitaliy Alexeev, Castro Valley, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/236,274

(22) Filed: Apr. 21, 2021

(65) Prior Publication Data

US 2021/0263566 A1    Aug. 26, 2021

Related U.S. Application Data

(63) Continuation of application No. 16/799,959, filed on Feb. 25, 2020, now Pat. No. 11,016,542.

(51) Int. Cl.

| | |
|---|---|
| *G06F 1/16* | (2006.01) |
| *G02B 27/01* | (2006.01) |
| *G06F 3/044* | (2006.01) |
| *H04B 1/3827* | (2015.01) |
| *H04B 7/04* | (2017.01) |
| *H04W 4/80* | (2018.01) |
| *G06F 3/0354* | (2013.01) |

(Continued)

(52) U.S. Cl.
CPC .......... *G06F 1/1692* (2013.01); *G02B 27/017* (2013.01); *G06F 1/163* (2013.01); *G06F 1/1698* (2013.01); *G06F 3/044* (2013.01); *H04B 1/385* (2013.01); *H04B 7/04* (2013.01); *H04W 4/80* (2018.02); *G02B 2027/0178* (2013.01)

(58) Field of Classification Search
USPC .......................................................... 345/7
See application file for complete search history.

(56) References Cited

U.S. PATENT DOCUMENTS

| | | |
|---|---|---|
| 7,213,917 B2 | 5/2007 | Jannard et al. |
| 7,331,666 B2 | 2/2008 | Swab et al. |
| | (Continued) | |

OTHER PUBLICATIONS

International Search Report, dated Feb. 24, 2021, PCT/US2021/017282.

(Continued)

*Primary Examiner* — Chineyere D Wills-Burns
(74) *Attorney, Agent, or Firm* — Brian R. Short

(57) ABSTRACT

Apparatuses, methods, and systems for touch pad sensors that are further operative as antennas, are disclosed. One apparatus includes a plurality of touch sensors, a controller, and a radio. The controller is operative to receive sensed signals of the plurality of touch sensors, and provide controls of the apparatus in response to the receive sensed signals of the plurality of touch sensors. The radio is operative to wirelessly communicate with an external wireless device. One or more conductive lines electrically connect the radio with one or more of the plurality of touch sensors, wherein the plurality of touch sensors operate as one or more antennas for facilitating the wireless communication.

20 Claims, 11 Drawing Sheets

(51) Int. Cl.
*H01Q 1/27* (2006.01)
*H01Q 15/00* (2006.01)
*H01Q 1/44* (2006.01)

(56) References Cited

U.S. PATENT DOCUMENTS

| | | | |
|---|---|---|---|
| 8,971,826 B2 | 3/2015 | Mohammed et al. | |
| 9,223,451 B1 | 12/2015 | Raffle | |
| 2010/0045928 A1* | 2/2010 | Levy | G02C 11/10 351/158 |
| 2010/0102943 A1 | 4/2010 | Rutledge et al. | |
| 2010/0321325 A1 | 12/2010 | Springer et al. | |
| 2011/0102734 A1* | 5/2011 | Howell | G02C 11/10 351/158 |
| 2012/0092284 A1* | 4/2012 | Rofougaran | H04M 1/725 345/173 |
| 2012/0329524 A1* | 12/2012 | Kent | H01Q 1/243 455/566 |
| 2013/0127980 A1* | 5/2013 | Haddick | G02B 27/0093 348/14.08 |
| 2013/0217342 A1* | 8/2013 | Abdul-Gaffoor | H01Q 1/52 455/77 |
| 2013/0265890 A1* | 10/2013 | Ali | H04B 7/0404 370/252 |
| 2014/0078094 A1* | 3/2014 | Yang | G06F 3/04166 345/174 |
| 2014/0126133 A1* | 5/2014 | Griffin | G06F 1/1652 361/679.27 |
| 2014/0176819 A1* | 6/2014 | Yilmaz | G06F 3/0446 349/12 |
| 2015/0258228 A1* | 9/2015 | Cohen | H05K 999/99 345/178 |
| 2016/0204839 A1 | 7/2016 | Liu et al. | |
| 2017/0033442 A1* | 2/2017 | Choi | H01Q 1/24 |
| 2017/0336901 A1* | 11/2017 | Mathew | G06F 3/04847 |
| 2018/0188838 A1 | 7/2018 | An et al. | |
| 2018/0253185 A1* | 9/2018 | Imanilov | G06F 3/04182 |
| 2020/0161740 A1* | 5/2020 | Islam | H04B 1/3833 |
| 2020/0209995 A1* | 7/2020 | So | G06F 3/0412 |

OTHER PUBLICATIONS

Written Opinion of the International Searching Authority, dated Feb. 25, 2021, PCT/US2021/017282.

* cited by examiner

TOUCH PAD SENSORS OPERATIVE AS A PLURALITY OF ANTENNAS

RELATED PATENT APPLICATIONS

This patent application is a continuation patent application of U.S. patent application Ser. No. 16/799,595 filed on Feb. 25, 2021, which is herein incorporated by reference.

FIELD OF THE DESCRIBED EMBODIMENTS

The described embodiments relate generally to touch pad sensors. More particularly, the described embodiments relate to systems, methods and apparatuses for touch pad sensors that are further operative as antennas.

BACKGROUND

Eyewear generally includes a temple arm and front frame. The temple arm may include touch pad sensors for allowing a user to input commands to a controller of the eyewear.

It is desirable to have methods apparatuses, and systems for touch pad sensors that are further operative as antennas.

SUMMARY

An embodiment includes an apparatus. The apparatus includes a plurality of touch sensors, a controller, and a radio. The controller is operative to receive sensed signals of the plurality of touch sensors, and provide controls of the apparatus in response to the receive sensed signals of the plurality of touch sensors. The radio is operative to wirelessly communicate with an external wireless device. A plurality of conductive lines electrically connects the radio with multiple of the plurality of touch sensors, wherein the plurality of touch sensors operates as a plurality of antennas for facilitating the wireless communication, wherein different contact points of different of the plurality of conductive lines with the plurality of touch sensors creates antennas having different frequency responses, wherein a frequency response of one antenna is selected to facilitate wireless communication having a first carrier frequency and a frequency response of another antenna is selected to facilitate wireless communication having a second carrier frequency.

Another embodiment includes a method. The method includes receiving, by a controller, sensed signals from a plurality of touch sensors, providing, by the controller, control of an apparatus based on the sensed signals, and wirelessly communicating, by a radio of the apparatus, with an external wireless device through one or more antennas formed by one or more of the plurality of touch sensors, wherein a plurality of conductive lines electrically connects the radio with multiple of the plurality of touch sensors, wherein the plurality of touch sensors operates as a plurality of antennas for facilitating the wireless communication, wherein different contact points of different of the plurality of conductive lines with the plurality of touch sensors creates antennas having different frequency responses, wherein a frequency response of one antenna is selected to facilitate wireless communication having a first carrier frequency and a frequency response of another antenna is selected to facilitate wireless communication having a second carrier frequency.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for touch pad sensors that are further operative as antennas. For an embodiment, the touch pad sensors are integrated into eyewear. For an embodiment, the touch pad sensors operate to receive inputs from a user which are provided to a controller for controlling the eyewear. For an embodiment, the touch pad sensors further operate as one of more antennas of a radio. For an embodiment, the controller and the radio are integrated into a temple arm of the eyewear.

The design of electronic eyewear, such as, augmented reality (AR) glasses is very critical to the popularity of the electronic eyewear in the consumer electronics market. Generally, the front frame of the glasses is dedicated to style and fashion rather than to functionality of the eyewear. At least some embodiments include dedicating the frame of the eyewear to curvy and fashion design, and dedicating the one or more temple arms of the electronic eyewear to housing electronic circuitry and/or housing a battery.

At least some embodiments include touch pads on the eyewear (for an embodiment, the temple arm of the eyewear) that allow a user to input commands to a controller of the eyewear. For a least some embodiments, a majority of electronic components of the eyewear is located on main printed circuit board within the temple arm(s).

Figure 1:
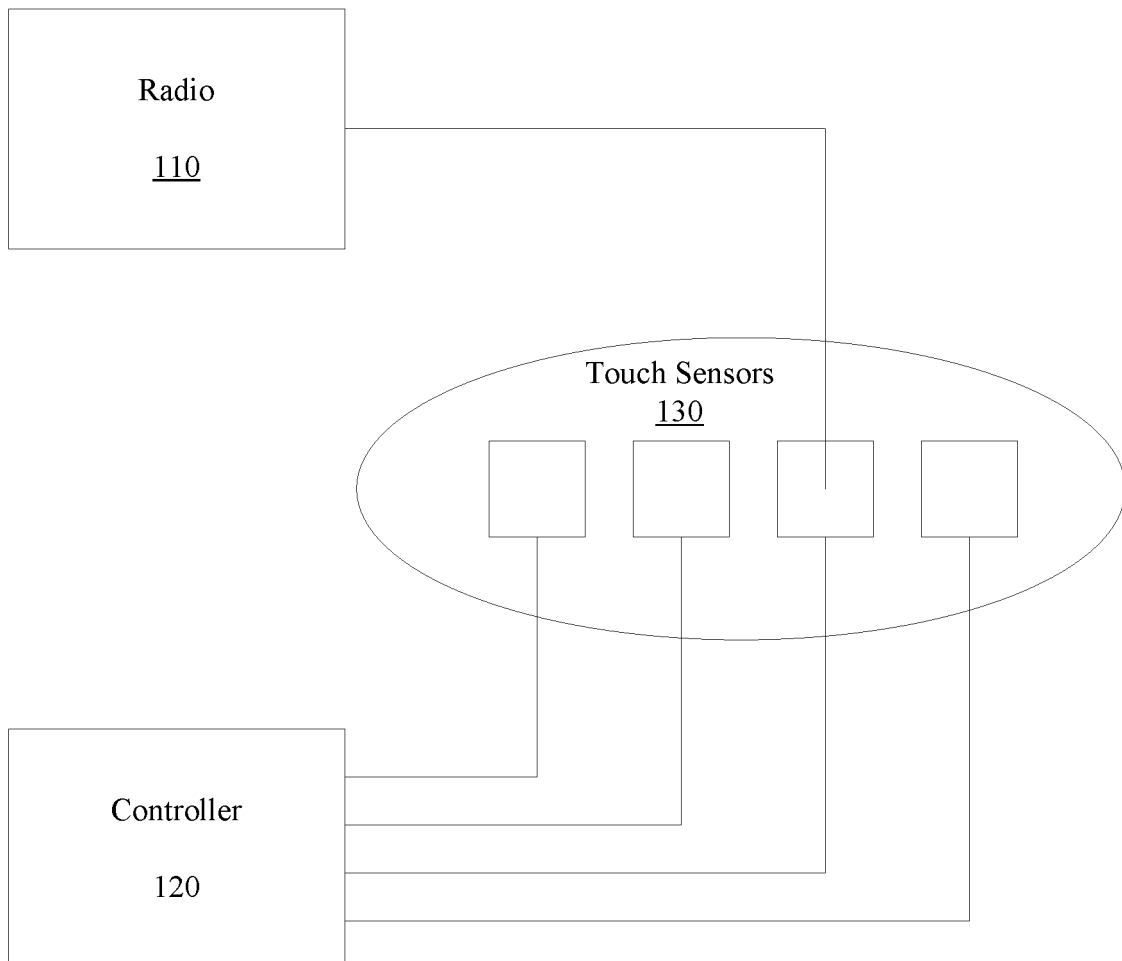
FIG. 1 shows a radio, a controller, and touch sensors, according to an embodiment.

FIG. 1 shows a radio 110, a controller 120, and touch sensors 130, according to an embodiment. For an embodiment, the radio 110, the controller 120, and the touch sensors 130 are integrated into a temple arm of eyewear.

For an embodiment, the touch sensors 130 are receptive to receiving input control from a user. For example, for an embodiment, the touch sensors 130 include capacitive touch sensors that sense capacitance changes due to finger pressure of the user. Changes in capacitance are sensed which allow the user to provide input controls to a controller of the eyewear through changes in finger pressure. For an embodiment, the touch sensors 130 include a capacitive touch/slider at a temple arm of eyewear which provides a user interface for electronic eyewear, such as, AR (augmented reality) glasses and/or AR glasses systems. For an embodiment, the capacitive touch/slider is located on a side of the temple arm. The sensed inputs of the touch sensors 130 provide user control of operation of the controller 120. For an embodiment, the touch sensors 130 includes a plurality of electrodes, wherein each electrode operates as one sensing channel. When a finger is on the top of electrodes, the capacitance of corresponding electrodes is altered, and the altered capacitance is sensed by the controller.

For at least some embodiments, the touch sensors 130 are also electrically connected to a radio, and operate as one or more antennas for supporting wireless communication of the radio 110. That is, for an embodiment, the touch sensors 130 are re-used (that is, used as touch sensors, and re-used as antennas) to operate as a one or more frequency band metamaterial antennas. The dual utilization of the touch pads reduces the amount of area/space occupied by the touch pads need for providing user inputs and for providing antennas needed to wirelessly communicate with external wireless devices. That is, the dual utilization of the touch pads address and mitigates the space problem presented to electronic eyewear that includes both a radio for wireless communication and touch pads for receiving user control.

For at least some embodiments, the plurality of electrodes of the touch sensors are periodically and closely spaced. For an embodiment, when a RF (radio frequency) signal of the radio 110 is fed to plurality of electrodes, and the plurality of electrodes form a metamaterial antenna.

Figure 2:
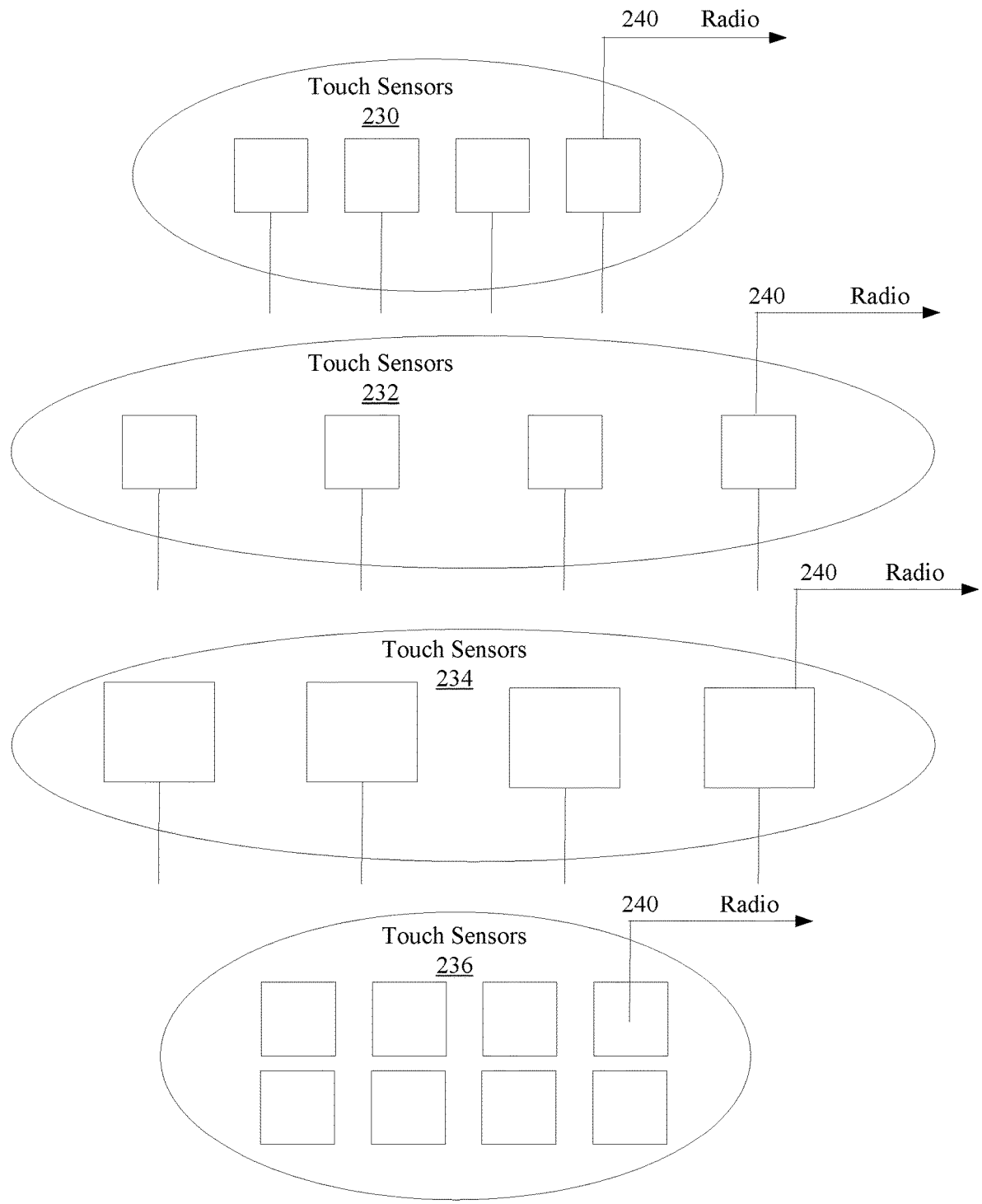
FIG. 2 shows various configurations of touch sensors, according to an embodiment.

FIG. 2 shows various configurations of touch sensors, according to an embodiment. The different configurations 230, 232, 234, 236 include different degrees of spacing between pads of a plurality of touch sensors, varying surface areas of the pads of the touch sensors, and varying configurations of the plurality of touch sensors.

Configuration 230 of the touch sensors includes a first touch pad size, first touch pad spacing, and first touch pad orientation. Configuration 232 of the touch pads includes the first touch pad size, but includes a different touch pad spacing. Configuration 234 of the touch pads includes a different touch pad size, and the different touch pad spacing. Configuration 236 of the touch pads includes a different configuration. That is, the configurations 230, 232, 234 include one dimensional arrays of touch sensors, and the configuration 236 includes a two-dimensional array of touch sensors.

Each of the touch pad configurations 230, 232, 234, 236 includes a conductive connection 240 to a radio. As described, for at least some embodiments, each of the touch pad configurations 230, 232, 234, 236 operate as one of more antennas for supporting electromagnetic wireless communication between the radio and another wireless device. However, a frequency response of each of the different touch pad configurations 230, 232, 234, 236 is tuned differently. That is, each of the different touch pad configurations 230, 232, 234, 236 more readily support a different carrier frequency of the wireless communication.

The carrier frequencies supported by the different touch pad configurations 230, 232, 234, 236 varies based on the surface area of the touch pads, a separation (distance) between the pads, and the orientation of the different touch pads. As least some embodiments include simulating or experimenting with the different touch pad configurations to determine which pad configuration more ideally supports a desired carrier frequency of wireless communication through the touch pads.

Further, the location within the touch pads in which the conductive line(s) 240 between the radio and the touch pads contact the touch pads influences the supported carrier frequency of wireless communication through the touch pads. Different contact points will have different frequency responses, and accordingly, be more suited for supporting different carrier frequencies of wireless communication.

As previously described, for an embodiment, the touch sensors include a capacitive touch sensor that includes a slider of closely-spaced periodic conductive pads/electrodes. By feeding an RF signal of the radio to one of the capacitive touch pads, the whole panel of touch pads will be excited due to a high coupling coefficient at an RF frequency. For an embodiment, the periodic plurality of electrodes forms via-less metamaterial antenna. As previously described, the periodicity (spacing) between electrodes, the width/length of the electrodes, and gap between a printed circuit board and the surface of the electrodes determines the operating mode and frequency of the formed antenna (s), which sets the carrier frequency of wireless communication supported by the antenna(s) formed by the plurality of touch pads (electrodes).

Figure 3:
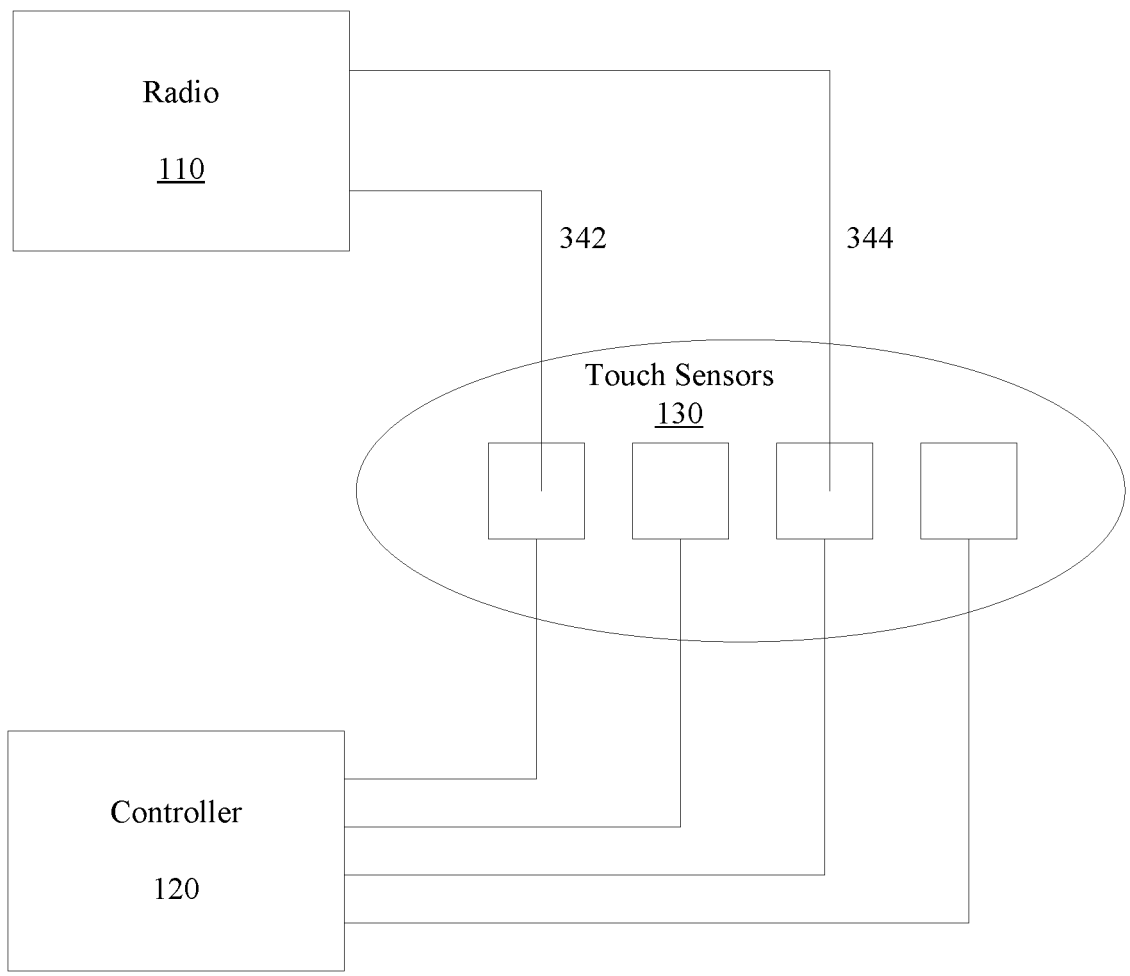
FIG. 3 shows a radio, a controller, and touch sensors, wherein multiple carrier frequencies of wireless communication of the radio are supported, according to an embodiment.

FIG. 3 shows a radio 110, a controller 120, and touch sensors 130, wherein multiple carrier frequencies of wireless communication of the radio are supported, according to an embodiment. As shown, multiple conductive paths 342, 344 are provided between the radio 110 and the touch sensors 130. As previously states, different contact points with the touch pads will create antennas having different frequency responses. Accordingly, the frequency response of the antenna formed by the conductive path 342 will be different than the frequency response of the antenna formed by the conductive path 344.

For at least some embodiments, the configuration of the touch pads and multiple conductive paths connected between the radio and the touch pads are selected to form multiple antennas, wherein the frequency response of one antenna is selected to facilitate wireless communication having a first carrier frequency and the frequency response of another antenna is selected to facilitate wireless communication having a second carrier frequency.

For at least some embodiments, touch/slider pads formed on the side arms of electronic eyewear (such as, AR glasses) are designed to be a multi-bands metamaterial antenna. For an embodiment, by feeding (through the conductive lines) the RF signal of the radio to different (as designed) locations of the touch pads, multi resonances of the metamaterial antenna are generated.

As described, the carrier frequencies supported by the antennas formed by the touch pads can be determined through simulations. The simulations can be performed for different touch pad sized, touch pad spacing, touch pad configurations, and contact points of the conductive lines to the touch pads.

Figure 4:
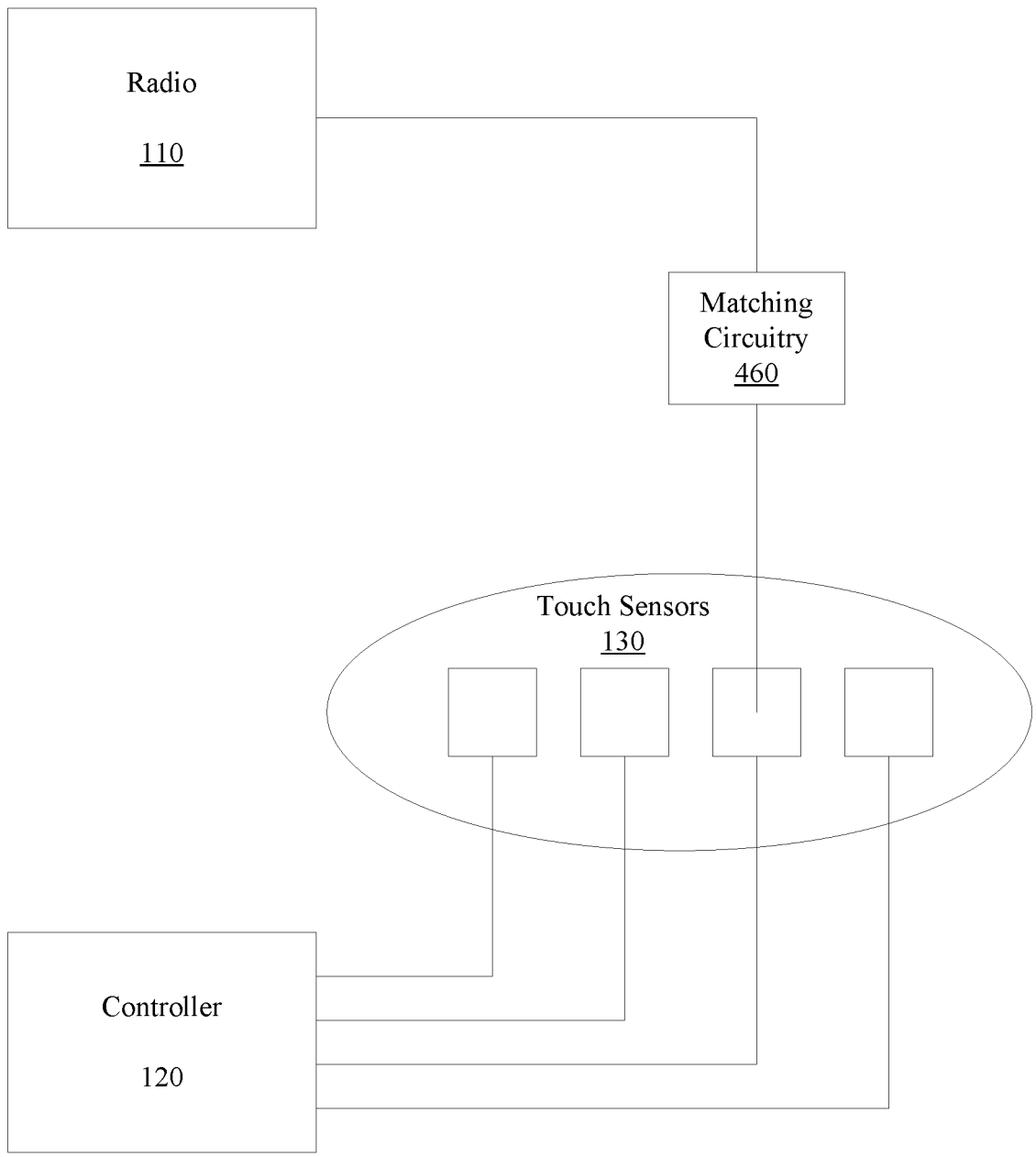
FIG. 4 shows a radio, a controller, touch sensors, and matching circuitry, according to an embodiment.

FIG. 4 shows a radio 110, a controller 120, touch sensors 130, and matching circuitry 460, according to an embodiment. The output of the of the radio 110 has an output impedance. The matching circuitry 460 is included between the radio 110 and the touch sensors to match the impedance load (formed by the conductive lines and the touch sensors) of the radio with the output impedance of the radio 110. Accordingly, the amount of RF energy delivered to the touch sensors 130 is enhanced. For an embodiment, the matching circuitry 460 includes inductors and capacitors that transform the antenna impedance (of the touch sensors) to a system impedance (for example, 50 ohm) to minimize return loss at an antenna feed between the radio 110 and the touch sensors 130.

Figure 5:
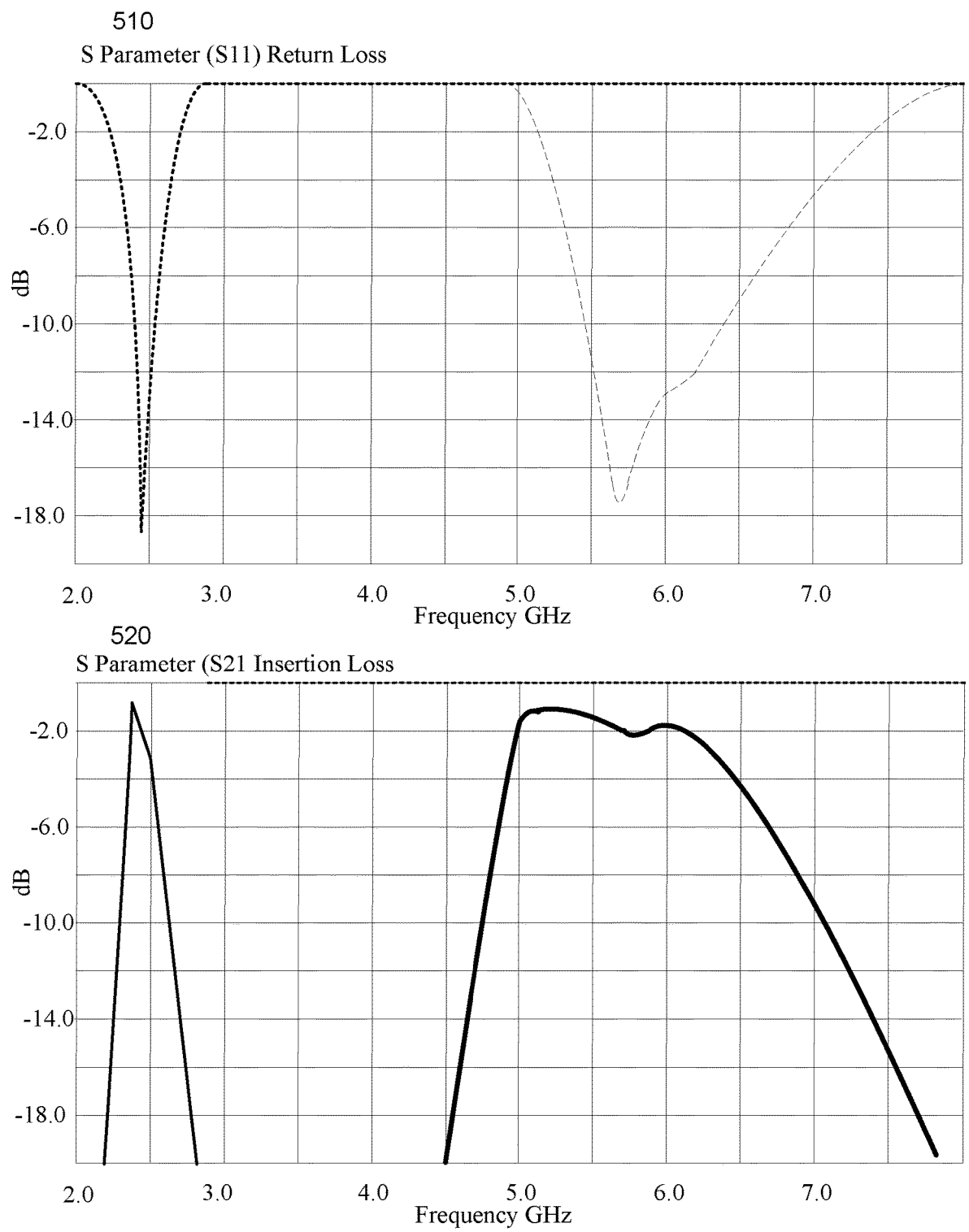
FIG. 5 shows S-parameter frequency responses of signals coupled between a radio and touch pad sensors, according to an embodiment.

FIG. 5 shows S (scattering)-parameter frequency responses of signals coupled between a radio and touch pad sensors, according to an embodiment. A first plot 510 depicts an exemplary reflection coefficient (S11) of an input to the touch pad sensors as realized by the radio over an example frequency range of 2 GHz to 7 GHz. As shown, the reflection coefficient is the lowest at the predesigned carrier frequencies of the wireless communication supported by the radio. For example, the carrier frequencies would be approximately 2.4 GHz and 5.7 GHz.

A second plot 520 depicts an exemplary insertion loss (S21) of an input to the touch pad sensors as realized by the radio over an example frequency range of 2 GHz to 7 GHz. As shown, the insertion loss is the lowest at the predesigned carrier frequencies of the wireless communication supported by the radio. For example, the carrier frequencies would be approximately 2.4 GHz and 5.7 GHz.

While the plots 510, 520 show a specific frequency range of operation, it is to be understood the touch pad antennas can be formed for many possible frequency ranges of operation. As described, the ranges of frequency supported by the antenna(s) formed by the touch sensors is adjustable at least by a selection of the size of the pads formed by the touch sensors, spacing between the pads, the number of pads, orientation of the pads relative to each other, and/or connection points to the pads from the radio.

Figure 6:
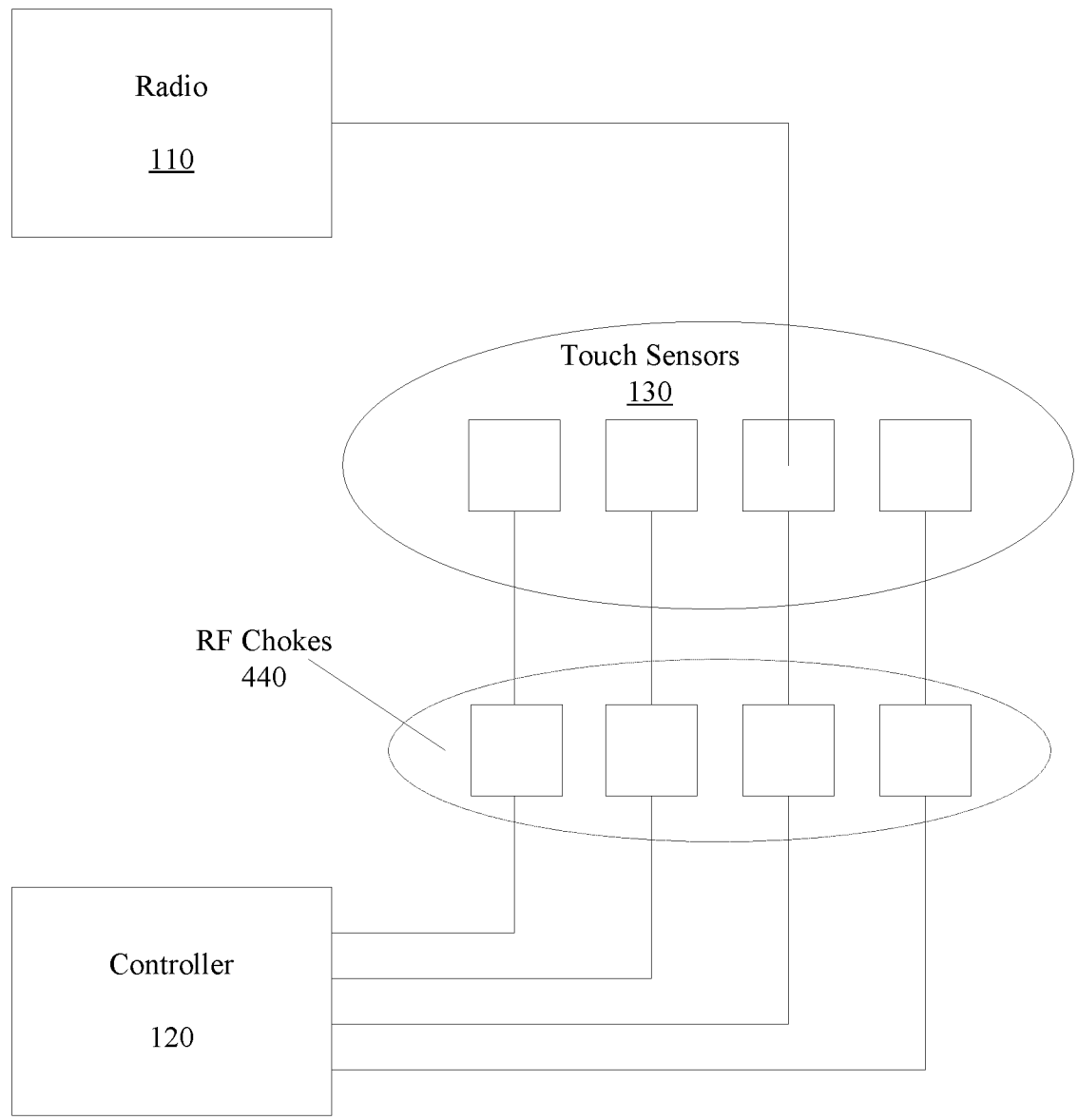
FIG. 6 shows a radio, a controller, touch sensors, and RF (radio frequency) chokes, according to an embodiment.

FIG. 6 shows a radio 110, a controller 120, touch sensors 130, and RF (radio frequency) chokes 440, according to an embodiment. The radio 110 and the antenna(s) formed by the touch pads 130 support wireless communication of RF signals. These RF signals can couple into and cause interference of the operation of the controller 120. Therefore, it is desirable to minimize or reduce the coupling of this RF energy into the controller 120. Further, it is desirable that the sensed signals generated by a user inputting controls through the touch pads 130 not be impeded. For an embodiment, the RF chokes 440 attenuate coupling of the RF signals of the radio 110 and the wireless communication into the controller 120, while minimally impacting the sensed signals input to the controller 120.

For an embodiment, the RF chokes 440 and a high pass filter (not shown) at the output of the radio 110 operate as a frequency duplexer to ensure concurrent operation of the touch sensors 130 and radio 110 without (or a reduction in) interference. The configurations of the RF chokes can be determined through simulation and/or experimentation.

Figure 7:
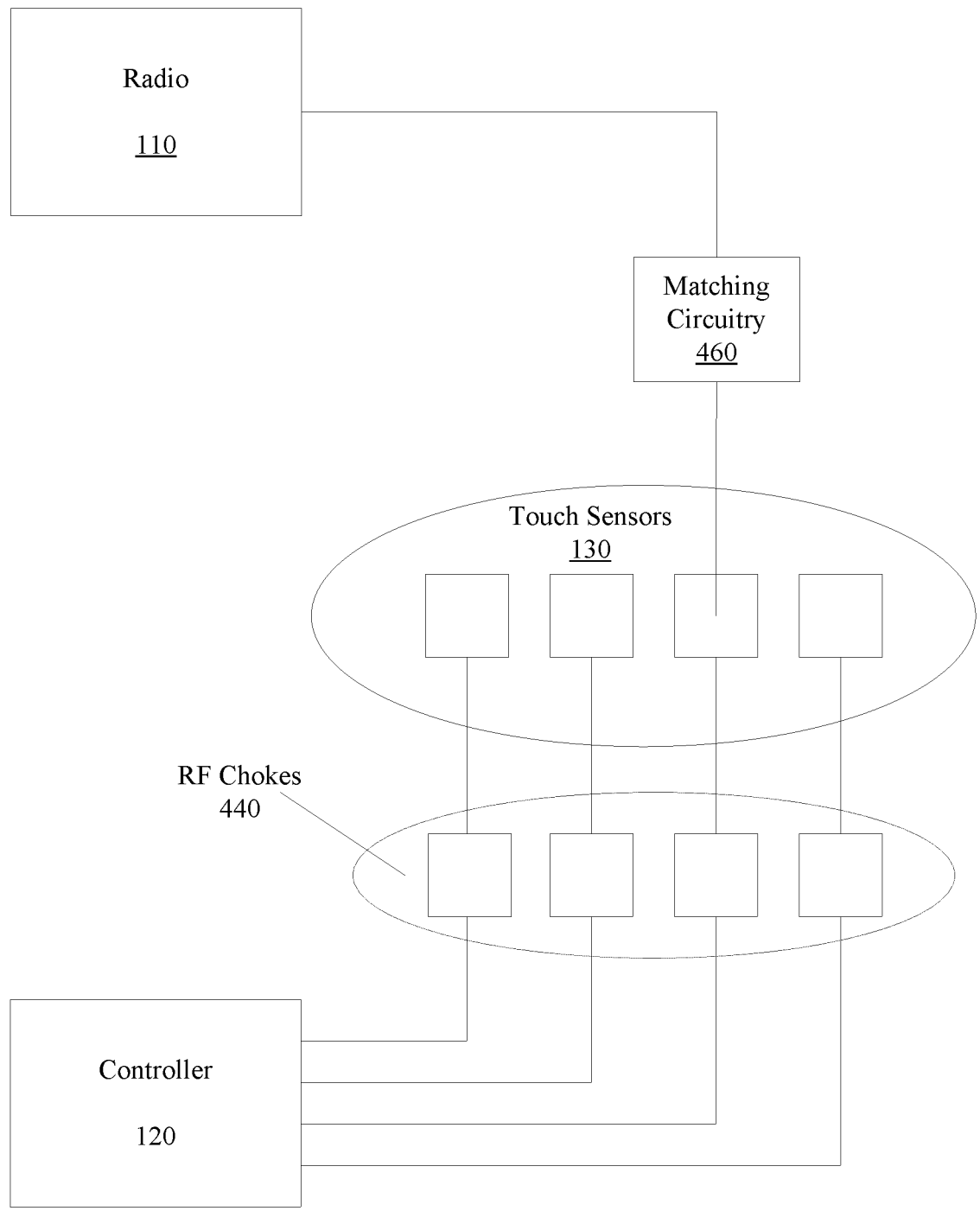
FIG. 7 shows a radio, a controller, touch sensors, matching circuitry, and RF chokes, according to an embodiment.

FIG. 7 shows a radio 100, a controller 120, touch sensors 130, matching circuitry 460, and RF chokes 440, according to an embodiment. This embodiment includes the functional operating parts of both FIGS. 4 and 6. For an embodiment, the configurations of the matching circuitry 460 and the RF chokes 440 are selected, simulated, and/or determined with the other present.

Figure 8:
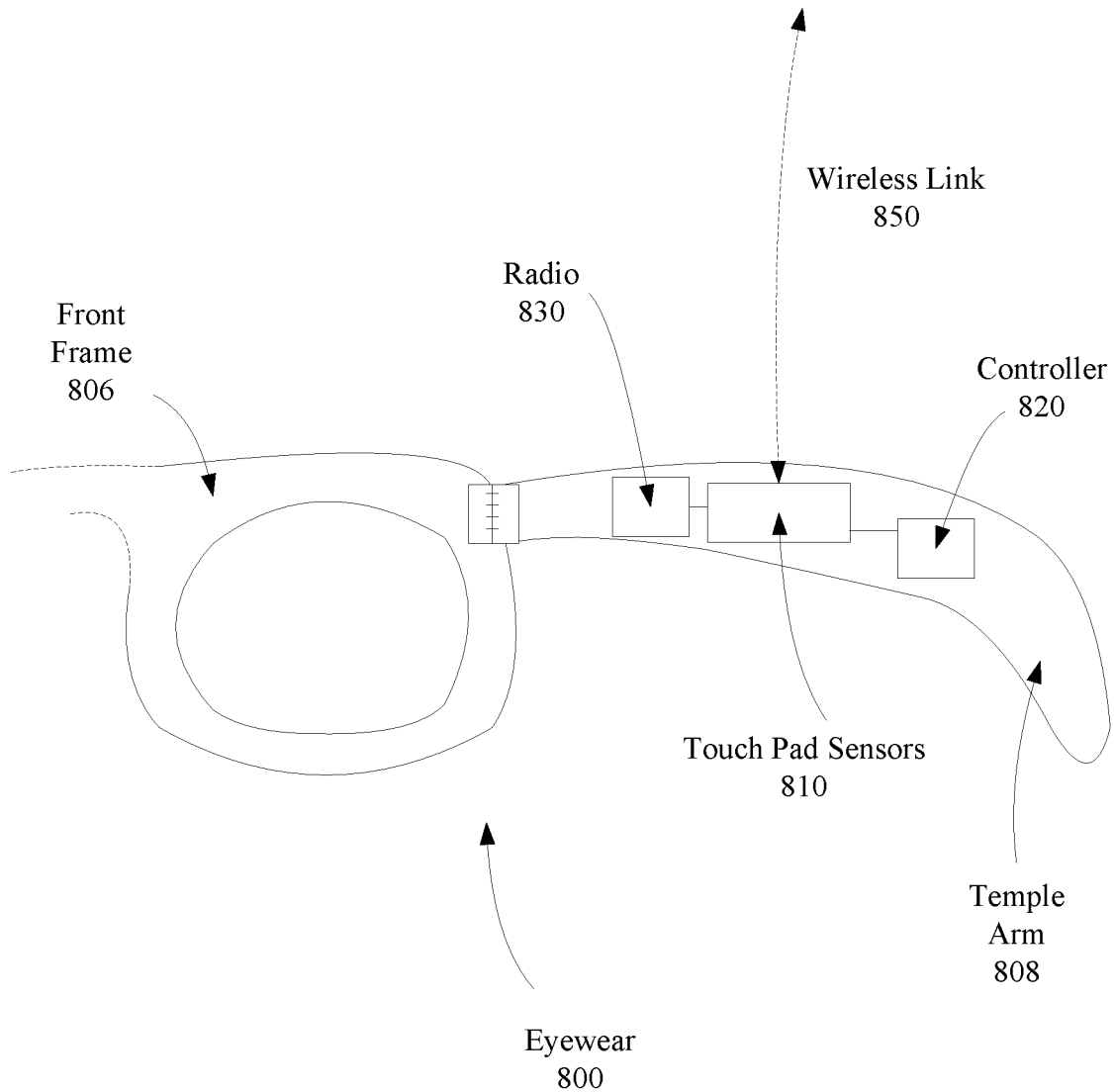
FIG. 8 shows eyewear that includes a radio, a controller, and touch sensors, according to an embodiment.

FIG. 8 shows eyewear 800 that includes a radio 806, a controller 820, and touch sensors 810, according to an embodiment. As previously described, the design of electronic eyewear, such as, augmented reality (AR) glasses is very critical to the popularity of the electronic eyewear in the consumer electronics market. Generally, a front frame 806 of the glasses (eyewear 800) is dedicated to style and fashion rather than to functionality of the eyewear. At least some embodiments include dedicating the front frame 806 of the eyewear 800 to curvy and fashion design, and dedicating the one or more temple arms 808 of the electronic eyewear 800 to housing for electronic circuitry (including the touch pad sensors 810, the controller 820, the radio 830) and/or housing a battery. Antennas formed by the touch pad sensors 810 also support wireless communication of the radio 830 through a wireless link 850.

Figure 9:
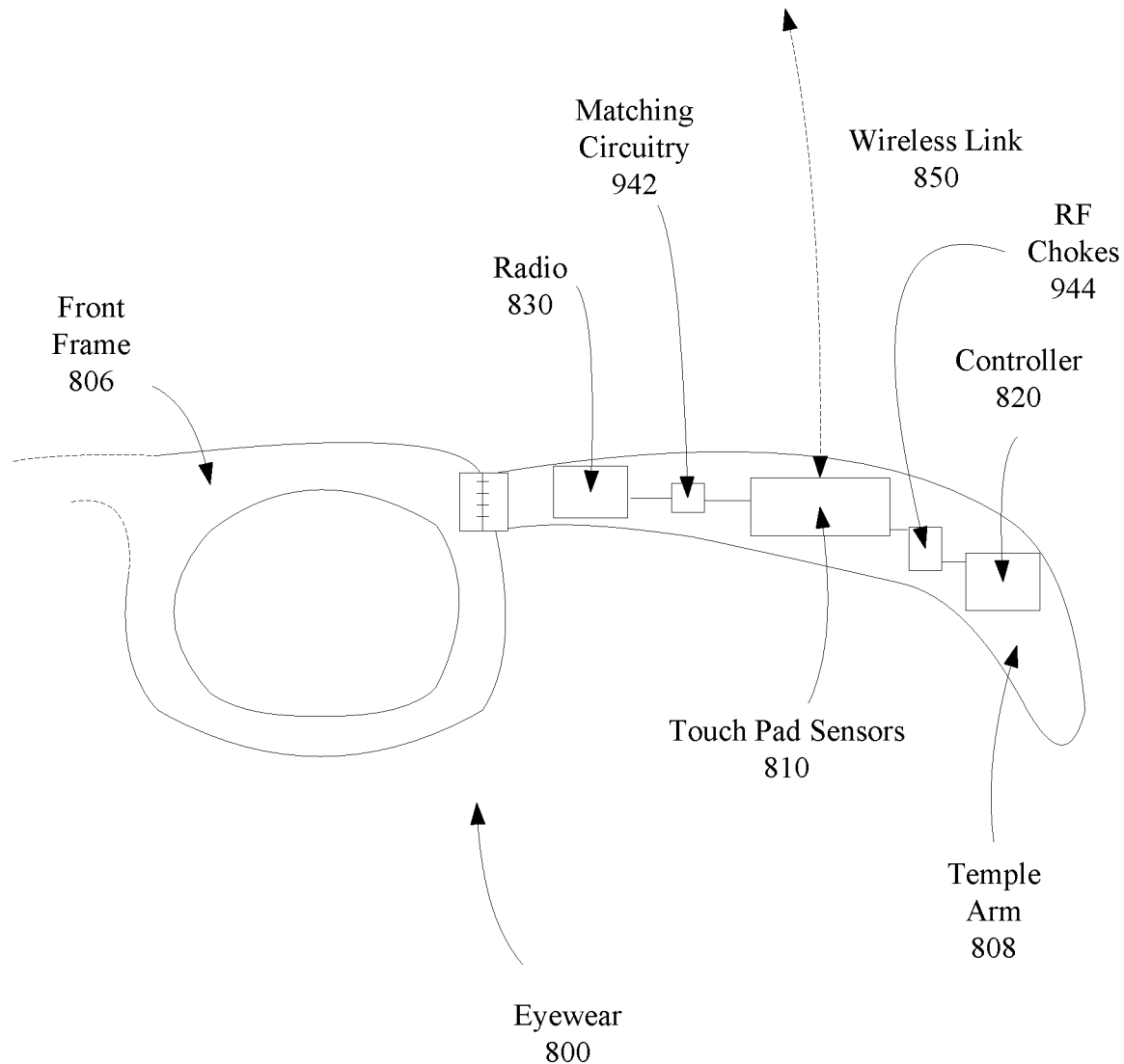
FIG. 9 shows eyewear that includes a radio, a controller, touch sensors, matching circuitry, and RF chokes, according to an embodiment.

FIG. 9 shows eyewear that includes a radio 830, a controller 820, touch sensors 810, matching circuitry 942, and RF chokes 944, according to an embodiment.

Figure 10:
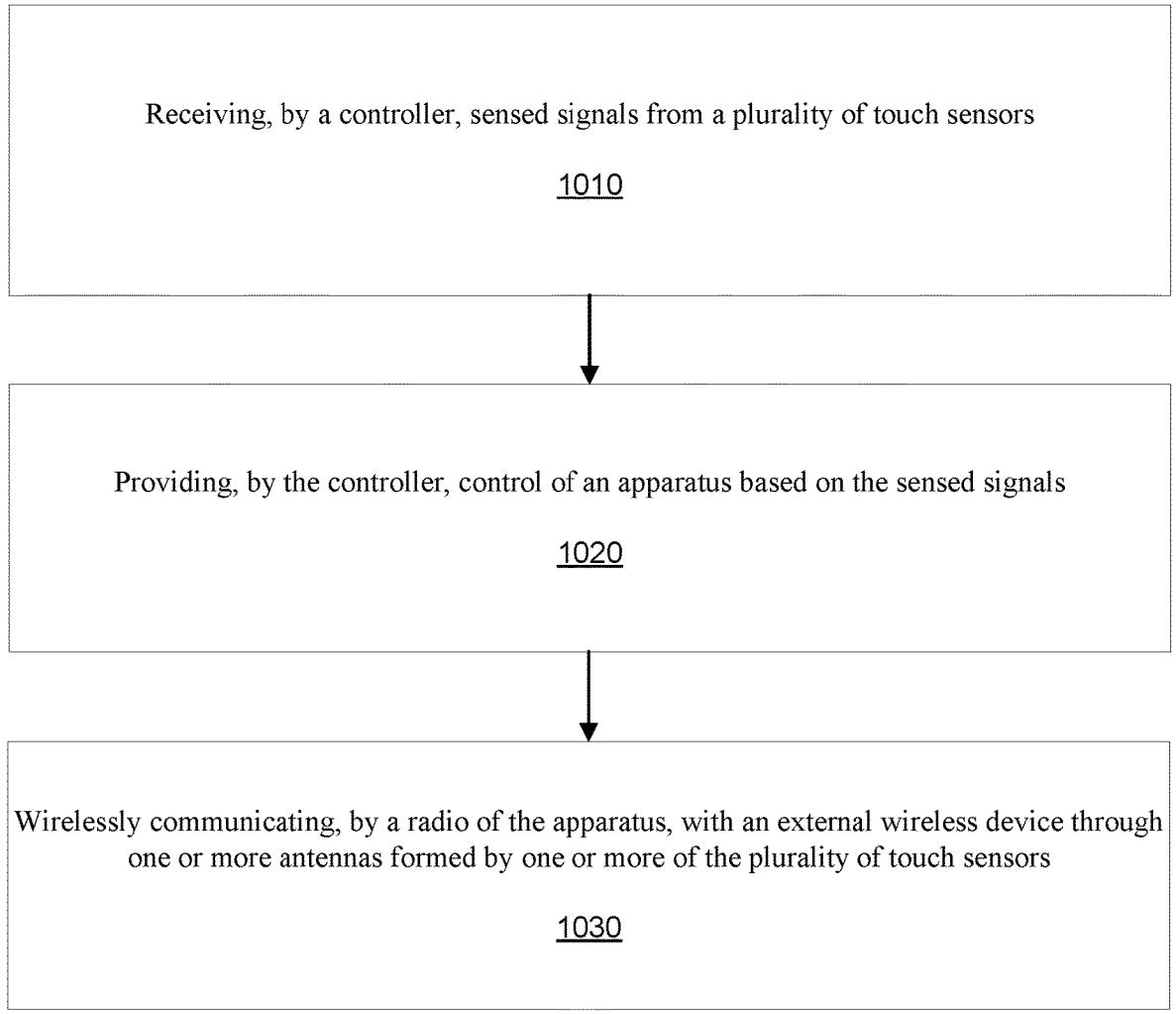
FIG. 10 is a flow chart that includes steps of a method of touch pad sensors that are operative as antennas, according to an embodiment.

FIG. 10 is a flow chart that includes steps of a method of touch pad sensors that are operative as antennas, according to an embodiment. A first step 1010 includes receiving, by a controller, sensed signals from a plurality of touch sensors. A second step 1020 includes providing, by the controller, control of an apparatus based on the sensed signals. A third step 1030 includes wirelessly communicating, by a radio of the apparatus, with an external wireless device through one or more antennas formed by one or more of the plurality of touch sensors.

For an embodiment, the plurality of touch sensors includes capacitive touch pads. As previously described, for an embodiment, the touch sensors 130 include capacitive touch sensors that sense capacitance changes due to finger pressure of the user. Changes in capacitance are sensed which allow the user to provide input controls to a controller of the eyewear through changes in finger pressure. For an embodiment, the touch sensors 130 include a capacitive touch/slider at a temple arm of eyewear which provides a user interface for electronic eyewear, such as, AR (augmented reality) glasses and/or AR glasses systems. For an embodiment, the capacitive touch/slider is located on a side of the temple arm. The sensed inputs of the touch sensors 130 provide for use control of operation of the controller 120. For an embodiment, the touch sensors 130 includes a plurality of electrodes, wherein each electrode operates as one sensing channel. When a finger is on the top of electrodes, the capacitance of corresponding electrodes will be altered, and the altered capacitance is sensed by the controller.

While described as capacitive touch sensors, it is to be understood that other embodiments include other types of touch sensors, such as, resistive touch sensors.

For an embodiment, a spacing between the plurality of touch pads is selected based at least in part on a carrier frequency of the wireless communication. For an embodiment, a surface of each of the plurality of touch pads is selected based at least in part on a carrier frequency of the wireless communication. As previously described, the carrier frequencies supported by the different touch pad configurations varies based on the surface area of the touch pads, a separation (distance) between the pads, and the orientation of the different touch pads. As least some embodiments include simulating or experimenting with the different touch pad configurations to determine which pad configuration more ideally supports a desired carrier frequency of wireless communication through the touch pads.

For an embodiment, a plurality of the one or more conductive lines are electrically connected to the plurality of sensors, wherein one of the plurality of conductive lines supports a first carrier frequency of the wireless communication and another one of the plurality of conductive lines supports a second carrier frequency of the wireless communications. As previously described, the configuration of the touch pads and multiple conductive paths connected between the radio and the touch pads are selected to form multiple antennas, wherein the frequency response of one antenna is selected to facilitate wireless communication having a first carrier frequency and the frequency response of another antenna is selected to facilitate wireless communication having a second carrier frequency.

As described, the carrier frequencies supported by the antennas formed by the touch pads can be determined through simulations. The simulations can be performed for different touch pad sized, touch pad spacing, touch pad configurations, and contact points of the conductive lines to the touch pads.

At least some embodiment further includes attenuating, by choke circuitry located between each of the plurality of touch sensors and the controller, coupling of signals of the wireless communication to the controller. As previously described, the radio and the antenna(s) formed by the touch pads support wireless communication of RF signals. These RF signals can couple into and cause interference of the operation of the controller. Therefore, it is desirable to minimize or reduce the coupling of this RF energy into the controller. Further, it is desirable that the sensed signals generated by a user inputting controls through the touch pads not be impeded. For an embodiment, the RF chokes attenuate coupling of the RF signals of the radio and the wireless communication into the controller, while minimally impacting the sensed signals input to the controller. For an embodiment, the RF chokes include electronic circuitry (capacitors, inductors, and/or resistors) that suppress the RF energy while passing the sensed signals of the touch sensors. For an embodiment, this includes selective filtering.

At least some embodiment further include matching, by one or more matching circuits, an output impedance of the radio, thereby enhancing coupling of signals of the wireless communication from the radio to the plurality of sensors. As previously described, the matching circuitry is included between the radio and the touch sensors to match the impedance load (formed by the conductive lines and the touch pads) of the radio with the output impedance of the radio. Accordingly, the amount of RF energy delivered to the touch sensors is enhanced. For an embodiment, the matching circuitry includes inductors and capacitors that transform the antenna impedance (of the touch pads) to a system impedance (for example, 50 ohm) to minimize return loss at the antenna feed.

For at least some embodiments, the plurality of touch pads forms an array of touch pads. As described, for at least some embodiments, each of the touch pad configurations operate as one of more antennas for supporting electromagnetic wireless communication between the radio and another wireless device. However, a frequency response of each of the different touch pad configurations is tuned differently. That is, each of the different touch pad configurations more readily support a different carrier frequency of the wireless communication.

Figure 11:
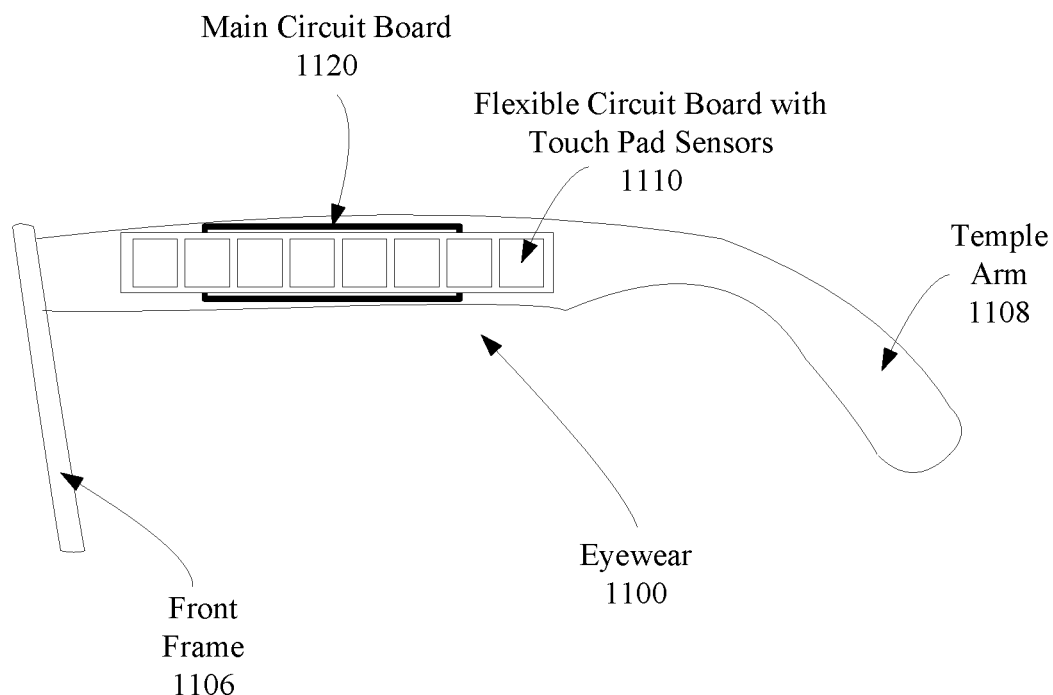
FIG. 11 shows electronic eyewear, wherein the controller resides on a flexible printed circuit board and the radio resides on a main printed circuit board, according to an embodiment.

FIG. 11 shows electronic eyewear 1100, wherein the controller resides on a flexible printed circuit board 1110 and the radio resides on a main printed circuit board 1120, according to an embodiment. For an embodiment, the flexible printed circuit board 1110 and the main printed circuit board 1120 are located within a temple arm 1108 of the electronic eyewear 1100. For an embodiment, the flexible printed circuit board 1110 further includes the plurality of touch pad sensors. The eyewear 1100 further includes a front frame 1106 that may include lenses.

For at least some embodiments, the main printed circuit board 1120 includes a radio chip set that includes the radio and support circuitry for one or more wireless standards, such as, WiFi, Bluetooth wireless, 2G, 3G, 4G, LTE/5G. For an embodiment, the main printed circuit board 1120 further includes a high-pass filter that block low frequency signals, but passes high frequency RF signals for wireless transmission, and reduces an impact of the RF path on the operation of the touch sensors.

For at least some embodiments, the main printed circuit board 1120 further includes matching circuitry that includes inductors an capacitors for transforming the antenna impedance to match the system (output of the radio) impedance (for example, 50 ohms) to minimize return loss at the antenna feed (conductive lines between the radio and the touch pads).

For at least some embodiments, the flexible printed circuit board 1110 includes the touch pads and the controller. Further, for at least some embodiments, the flexible printed circuit board 1110 includes the RF chokes, wherein each RF choke includes a large inductor that operates to block RF signals to the controller, and is placed in line with each sensing channel of the touch pad sensors.

For at least some embodiments, each touch pad includes an electrode that forms one sensing channel. When a finger is on the top of the electrodes, the capacitance of corresponding electrodes is altered and sensed by the controller. For at least some embodiments, that electrodes are periodically and closely spaced. When an RF signal of the radio is fed to the electrodes, all electrodes form a metamaterial antenna.

For at least some embodiments, a feed contact completes the electrical connections between the flexible printed circuit board 1110 and the main printed circuit board 1120. For at least some embodiments, the feed contacts are implemented by a spring clipper, a pogo-pin, or other mechanical parts to connect the flexible printed circuit board 1110 to the main printed circuit board 1120 electrically at RF frequencies.

Although specific embodiments have been described and illustrated, the embodiments are not to be limited to the specific forms or arrangements of parts so described and illustrated. The described embodiments are to only be limited by the claims.

What is claimed:

1. An apparatus, comprising:
a plurality of touch sensors;
a controller, the controller operative to:
  receive sensed signals of the plurality of touch sensors; and
  provide controls of the apparatus in response to the receive sensed signals of the plurality of touch sensors;
a radio, the radio operative to wirelessly communicate with an external wireless device; and
a plurality of conductive lines electrically connecting the radio with multiple of the plurality of touch sensors, wherein the plurality of touch sensors operate as a plurality of antennas for facilitating the wireless communication;
wherein different contact points of different of the plurality of conductive lines with the plurality of touch sensors creates antennas having different frequency responses, wherein a frequency response of one antenna is selected to facilitate wireless communication having a first carrier frequency and a frequency response of another antenna is selected to facilitate wireless communication having a second carrier frequency.

2. The apparatus of claim 1, wherein a configuration of the touch sensors and the plurality of conductive lines connected between the radio and the multiple of the plurality of touch sensors are selected to form multiple antennas.

3. The apparatus of claim 1, wherein the plurality of touch sensors comprises capacitive touch pads.

4. The apparatus of claim 1, wherein a spacing between the plurality of touch sensors is selected based at least in part on at least one of the first carrier frequency or the second carrier frequency of the wireless communication.

5. The apparatus of claim 1, wherein a surface area of each of the plurality of touch sensors is selected based at least in part on at least one of the first carrier frequency or the second carrier frequency of the wireless communication.

6. The apparatus of claim 1, further comprising choke circuitry located between each of the plurality of touch sensors and the controller, wherein the choke circuitry operates to attenuate coupling of signals of the wireless communication to the controller.

7. The apparatus of claim 1, further comprising one or more matching circuits, wherein the matching circuits operate to match an output impedance of the radio, and enhance coupling of signals of the wireless communication from the radio to the plurality of sensors.

8. The apparatus of claim 1, wherein the plurality of touch sensors forms an array of touch pads.

9. The apparatus of claim 8, wherein the flexible printed circuit board and the main printed circuit board are located within a temple arm of eyewear.

10. The apparatus of claim 1, wherein the controller resides on a flexible printed circuit board and the radio resides on a main printed circuit board.

11. An method, comprising:
receiving, by a controller, sensed signals from a plurality of touch sensors;
providing, by the controller, control of an apparatus based on the sensed signals; and
wirelessly communicating, by a radio of the apparatus, with an external wireless device through one or more antennas formed by one or more of the plurality of touch sensors;
wherein a plurality of conductive lines electrically connect the radio with multiple of the plurality of touch sensors, wherein the plurality of touch sensors operate as a plurality of antennas for facilitating the wireless communication;
wherein different contact points of different of the plurality of conductive lines with the plurality of touch sensors creates antennas having different frequency responses, wherein a frequency response of one antenna is selected to facilitate wireless communication having a first carrier frequency and a frequency response of another antenna is selected to facilitate wireless communication having a second carrier frequency.

12. The method of claim 11, wherein a configuration of the touch sensors and the plurality of conductive lines connected between the radio and the multiple of the plurality of touch sensors are selected to form multiple antennas.

13. The method of claim 11, wherein the plurality of touch sensors comprises capacitive touch pads.

14. The method of claim 11, wherein a spacing between the plurality of touch sensors is selected based at least in part on at least one of the first carrier frequency or the second carrier frequency of the wireless communication.

15. The method of claim 11, wherein a surface area of each of the plurality of touch sensors is selected based at least in part on at least one of the first carrier frequency or the second carrier frequency of the wireless communication.

16. The method of claim 11, further comprising attenuating, by choke circuitry located between each of the plurality of touch sensors and the controller, coupling of signals of the wireless communication to the controller.

17. The method of claim 11, further comprising matching, by one or more matching circuits, an output impedance of the radio, thereby enhancing coupling of signals of the wireless communication from the radio to the plurality of sensors.

18. The method of claim 11, wherein the plurality of touch sensors forms an array of touch pads.

19. The method of claim 11, wherein the controller resides on a flexible printed circuit board and the radio resides on a main printed circuit board.

20. The method of claim 11, wherein the flexible printed circuit board and the main printed circuit board are located within a temple arm of eyewear.

* * * * *